(12) United States Patent
Hey et al.

(10) Patent No.: US 9,244,657 B2
(45) Date of Patent: *Jan. 26, 2016

(54) SYSTEM AND METHOD FOR AN OBJECT INSTANCE ACQUIRER

(71) Applicant: International Business Machines Corporation, Armonk, NY (US)

(72) Inventors: Laurence A. Hey, Manly (AU); William J. Izard, Sydney (AU); Matthew J. Ponsford, Manly (AU)

(73) Assignee: International Business Machines Corporation, Armonk, NY (US)

( * ) Notice: Subject to any disclaimer, the term of this patent is extended or adjusted under 35 U.S.C. 154(b) by 81 days.

This patent is subject to a terminal disclaimer.

(21) Appl. No.: 14/065,553

(22) Filed: Oct. 29, 2013

(65) Prior Publication Data

US 2014/0237449 A1 Aug. 21, 2014

Related U.S. Application Data

(63) Continuation of application No. 13/722,754, filed on Feb. 21, 2013.

(51) Int. Cl.
*G06F 9/44* (2006.01)
(52) U.S. Cl.
CPC *G06F 8/315* (2013.01); *G06F 8/33* (2013.01); *G06F 8/73* (2013.01)
(58) Field of Classification Search
None
See application file for complete search history.

(56) References Cited

U.S. PATENT DOCUMENTS

| | | | |
|---|---|---|---|
| 6,314,559 B1 | 11/2001 | Sollich | |
| 7,080,370 B1 | 7/2006 | Crowl et al. | |
| 7,296,264 B2 * | 11/2007 | Zatloukal et al. | 717/143 |
| 8,266,585 B2 * | 9/2012 | Funt et al. | 717/109 |
| 2001/0016953 A1 | 8/2001 | Barry et al. | |
| 2002/0016953 A1 * | 2/2002 | Sollich | 717/1 |
| 2005/0015747 A1 | 1/2005 | Zatloukal et al. | |
| 2005/0229154 A1 * | 10/2005 | Hiew et al. | 717/110 |
| 2006/0080639 A1 | 4/2006 | Bustelo et al. | |
| 2006/0090154 A1 | 4/2006 | Bustelo et al. | |
| 2007/0006149 A1 | 1/2007 | Resnick et al. | |
| 2008/0235677 A1 | 9/2008 | Aniszczyk et al. | |
| 2008/0270981 A1 | 10/2008 | Hutchison et al. | |
| 2008/0320438 A1 | 12/2008 | Funto et al. | |
| 2009/0024937 A1 | 1/2009 | Lauff et al. | |
| 2009/0313597 A1 | 12/2009 | Rathbone et al. | |
| 2010/0269095 A1 | 10/2010 | King et al. | |

* cited by examiner

*Primary Examiner* — Jason Mitchell
(74) *Attorney, Agent, or Firm* — Holland & Knight LLP; Brian J. Colandreo, Esq.; Jeffrey T. Placker, Esq.

(57) ABSTRACT

A method, computer program product, and computer system for receiving, at a computing device, an input including an indication of a type of an object for which an instance is required. Code that is declared in a software development application is scanned for the instance. An output is generated including one or more suggestions how to acquire the instance based upon, at least in part, the code that is declared in the software development application.

6 Claims, 7 Drawing Sheets

SYSTEM AND METHOD FOR AN OBJECT INSTANCE ACQUIRER

RELATED APPLICATIONS

The subject application is a continuation application of U.S. patent application Ser. No. 13/772,754, filed on Feb. 21, 2013, the entire content of which is herein incorporated by reference.

BACKGROUND

When a software developer is writing code, e.g., in an object orientated product, it may be difficult to find such things as how to acquire an instance of a particular object. An example reason for this difficulty may include the fact that there may be many patterns through which an instance of an object may be acquired.

Current options available to a developer to find how to acquire an instance of a particular object may be limited. For example, the developer may be required to already have extensive knowledge of a product or an Application Programming Interface (API) in question. Additionally/alternatively, the developer may be required to laboriously look through the documentation of the product or the API, if such documentation exists.

BRIEF SUMMARY OF DISCLOSURE

In one implementation, a method, performed by one or more computing devices, comprises receiving, at a computing device, an input including an indication of a type of an object for which an instance is required. Code that is declared in a software development application is scanned for the instance. An output is generated including one or more suggestions how to acquire the instance based upon, at least in part, the code that is declared in the software development application.

One or more of the following features may be included. The code that is declared in the software development application may include at least one of code that is part of a current project in the software development application, code that is imported as binaries, and code made aware to the software development application through a remote service. Scanning the code may include scanning for at least one instance of one or more objects in an editor of the software development application. Scanning the code may include scanning code for at least one of constructors and methods that return instances of the object. Scanning the code may include scanning one or more parameters of at least one of the constructors and methods. Generating the output including one or more suggestions how to acquire the instance may include ordering the one or more suggestions according to complexity. Generating the output including one or more suggestions how to acquire the instance may include forming a tree of instance acquisition methods.

In another implementation, a computing system includes a processor and a memory configured to perform operations comprising receiving an input including an indication of a type of an object for which an instance is required. Code that is declared in a software development application is scanned for the instance. An output is generated including one or more suggestions how to acquire the instance based upon, at least in part, the code that is declared in the software development application.

One or more of the following features may be included. The code that is declared in the software development application may include at least one of code that is part of a current project in the software development application, code that is imported as binaries, and code made aware to the software development application through a remote service. Scanning the code may include scanning for at least one instance of one or more objects in an editor of the software development application. Scanning the code may include scanning code for at least one of constructors and methods that return instances of the object. Scanning the code may include scanning one or more parameters of at least one of the constructors and methods. Generating the output including one or more suggestions how to acquire the instance may include ordering the one or more suggestions according to complexity. Generating the output including one or more suggestions how to acquire the instance may include forming a tree of instance acquisition methods.

In another implementation, a computer program product resides on a computer readable storage medium that has a plurality of instructions stored on it. When executed by a processor, the instructions cause the processor to perform operations comprising receiving an input including an indication of a type of an object for which an instance is required. Code that is declared in a software development application is scanned for the instance. An output is generated including one or more suggestions how to acquire the instance based upon, at least in part, the code that is declared in the software development application.

One or more of the following features may be included. The code that is declared in the software development application may include at least one of code that is part of a current project in the software development application, code that is imported as binaries, and code made aware to the software development application through a remote service. Scanning the code may include scanning for at least one instance of one or more objects in an editor of the software development application. Scanning the code may include scanning code for at least one of constructors and methods that return instances of the object. Scanning the code may include scanning one or more parameters of at least one of the constructors and methods. Generating the output including one or more suggestions how to acquire the instance may include ordering the one or more suggestions according to complexity. Generating the output including one or more suggestions how to acquire the instance may include forming a tree of instance acquisition methods.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
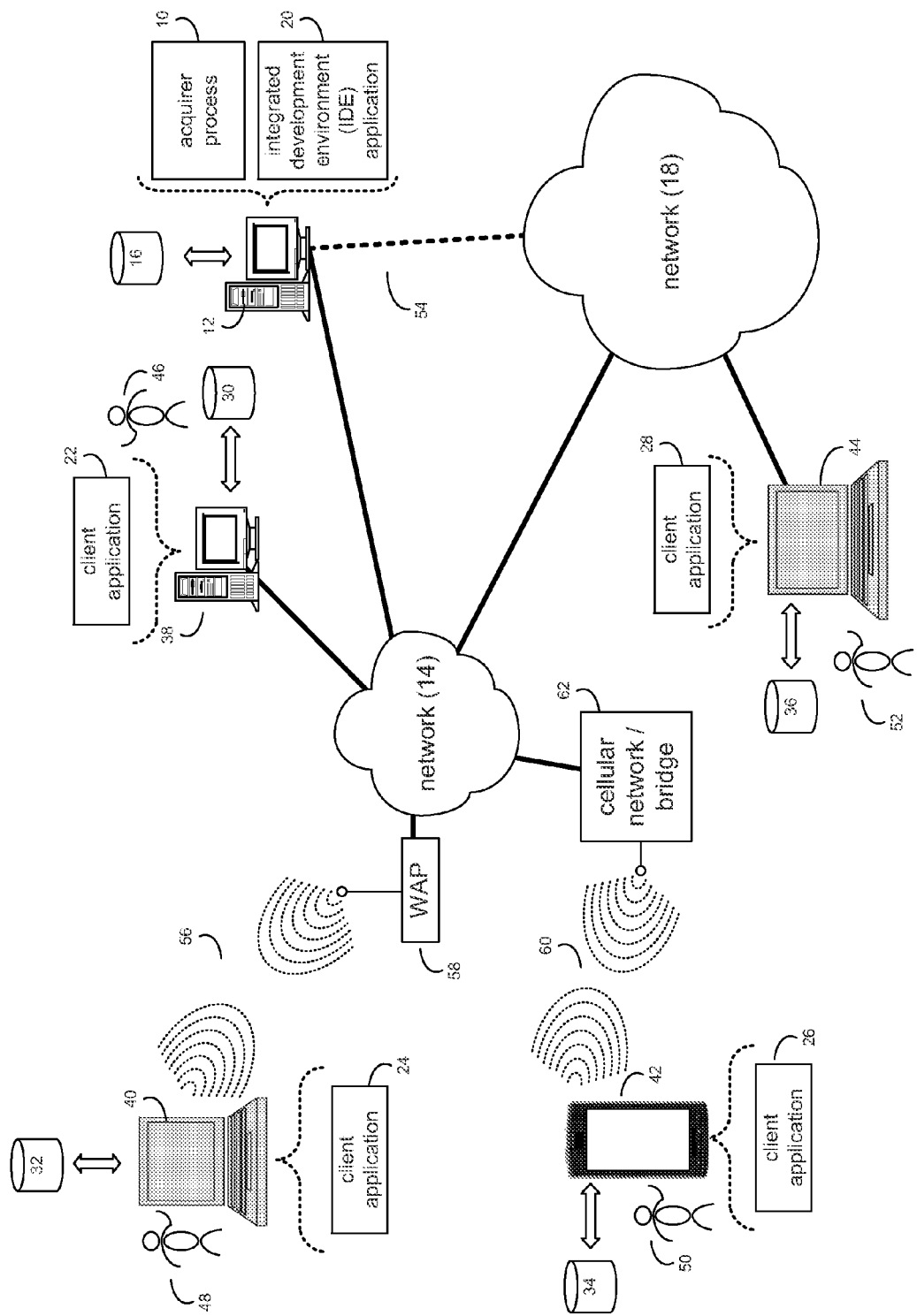
FIG. 1 is an illustrative diagrammatic view of an acquirer process coupled to a distributed computing network according to one or more implementations of the present disclosure.

As will be appreciated by one skilled in the art, the present disclosure may be embodied as a method, system, or computer program product. Accordingly, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of this document, a computer-usable or computer-readable, storage medium may be any tangible medium that can contain or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. The computer readable program code may be transmitted using any appropriate medium, including but not limited to the internet, wireline, optical fiber cable, RF, etc. A computer readable signal medium may be any computer readable medium that is not a computer readable storage medium and that can communicate, propagate, or transport a program for use by or in connection with an instruction execution system, apparatus, or device.

Computer program code for carrying out operations of the present disclosure may be written in an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript or PERL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider).

The flowchart and block diagrams in the figures illustrate the architecture, functionality, and operation of possible implementations of apparatus (systems), methods and computer program products according to various implementations of the present disclosure. It will be understood that each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

The computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring to FIG. 1, there is shown acquirer process 10 that may reside on and may be executed by a computer (e.g., computer 12), which may be connected to a network (e.g., network 14) (e.g., the internet or a local area network).

Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, acquirer process 10 may receive, at a computing device, an input including and indication of a type of an object for which an instance is required. Code that is declared in a software development application may be scanned for the instance. An output may be generated including one or more suggestions how to acquire the instance based upon, at least in part, the code that is declared in the software development application.

The instruction sets and subroutines of acquirer process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may include a data store, such as a database (e.g., relational database, object-oriented database, etc.) and may be located within any suitable memory location, such as storage device 16 coupled to computer 12. Any data described throughout may be stored in the data store. In some implementations, computer 12 may utilize a database management system such as, but not limited to, "My Structured Query Language" (MySQL®) in order to provide multi-user access to one or more databases, such as the above noted relational database. The data store may also be a custom database, such as, for example, a flat file database or an XML database. Any other form(s) of a data storage structure and/or organization may also be used. Acquirer process 10 may be a component of the data store, a stand alone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network.

Computer 12 may execute an integrated development environment (IDE) application (e.g., IDE application 20), examples of which may include, but are not limited to, e.g., a compiler application, an interpreter application, a source code editor application, a debugger application, a build automation tool application, or other application that may in whole or in part provide facilities to software developers for software development. Acquirer process 10 and/or IDE application 20 may be accessed via client applications 22, 24, 26, 28. Acquirer process 10 may be a stand alone application, or may be an applet/application/script that may interact with and/or be executed within IDE application 20 and/or one or more of client applications 22, 24, 26, 28. IDE application 20 may be a stand alone application, or may be an applet/application/script that may interact with and/or be executed within acquirer process 10 and/or one or more of client applications 22, 24, 26, 28. One or more of client applications 22, 24, 26, 28 may be a stand alone application, or may be an applet/application/script that may interact with and/or be executed within acquirer process 10 and/or IDE application 20. Examples of client applications 22, 24, 26, 28 may include, but are not limited to, e.g., a compiler application, an interpreter application, a source code editor application, a debugger application, a build automation tool application, or other application that may in whole or in part provide facilities to software developers for software development, a standard and/or mobile web browser, an email client application, a textual and/or a graphical user interface, a customized web browser, a plugin, or a custom application. The instruction sets and subroutines of client applications 22, 24, 26, 28, which may be stored on storage devices 30, 32, 34, 36 coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart phone (e.g., client electronic device 42), a notebook computer (e.g., client electronic device 44), a tablet (not shown), a server (not shown), a data-enabled, cellular telephone (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

One or more of client applications 22, 24, 26, 28 may be configured to effectuate some or all of the functionality of acquirer process 10 (and vice versa). Accordingly, acquirer process 10 may be a purely server-side application, a purely client-side application, or a hybrid server-side/client-side application that is cooperatively executed by one or more of client applications 22, 24, 26, 28 and/or acquirer process 10.

One or more of client applications 22, 24, 26, 28 may be configured to effectuate some or all of the functionality of IDE application 20 (and vice versa). Accordingly, IDE application 20 may be a purely server-side application, a purely client-side application, or a hybrid server-side/client-side application that is cooperatively executed by one or more of client applications 22, 24, 26, 28 and/or IDE application 20. As one or more of client applications 22, 24, 26, 28, acquirer process 10, and IDE application 20, taken singly or in any combination, may effectuate some or all of the same functionality, any description of effectuating such functionality via one or more of client applications 22, 24, 26, 28, acquirer process 10, IDE application 20, or combination thereof, and any described interaction(s) between one or more of client applications 22, 24, 26, 28, acquirer process 10, IDE application 20, or combination thereof to effectuate such functionality, should be taken as an example only and not to limit the scope of the disclosure.

Users 46, 48, 50, 52 may access computer 12 and acquirer process 10 (e.g., using one or more of client electronic devices 38, 40, 42, 44) directly through network 14 or through secondary network 18. Further, computer 12 may be connected to network 14 through secondary network 18, as illustrated with phantom link line 54. Acquirer process 10 may include one or more user interfaces, such as browsers and textual or graphical user interfaces, through which users 46, 48, 50, 52 may access acquirer process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi, and/or Bluetooth™ device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ is a telecommunications industry specification that allows, e.g., mobile phones, computers, smart phones, and other electronic devices to be interconnected using a short-range wireless connection.

Figure 2:
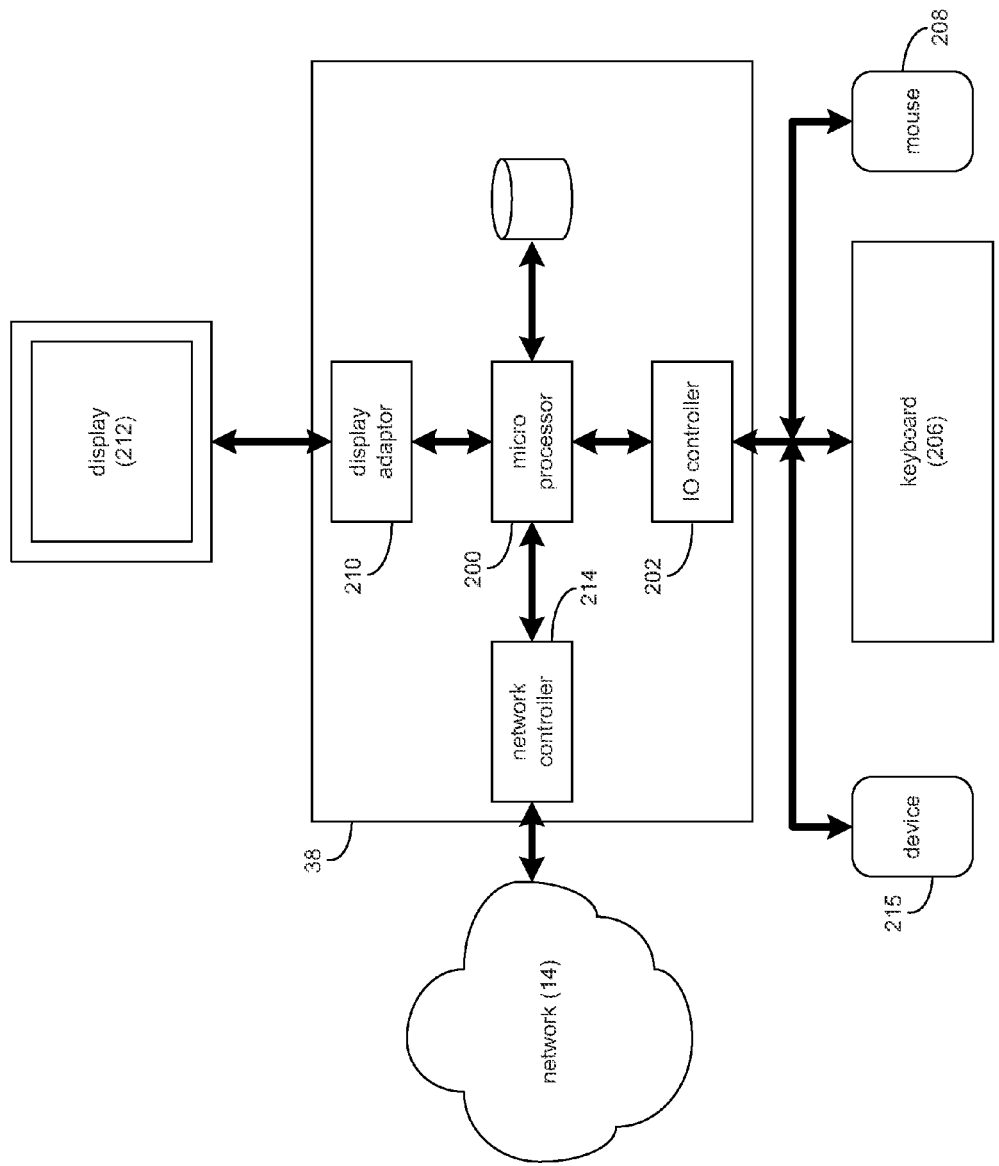
FIG. 2 is a diagrammatic view of a client electronic device of FIG. 1 according to one or more implementations of the present disclosure.
Figure 3:
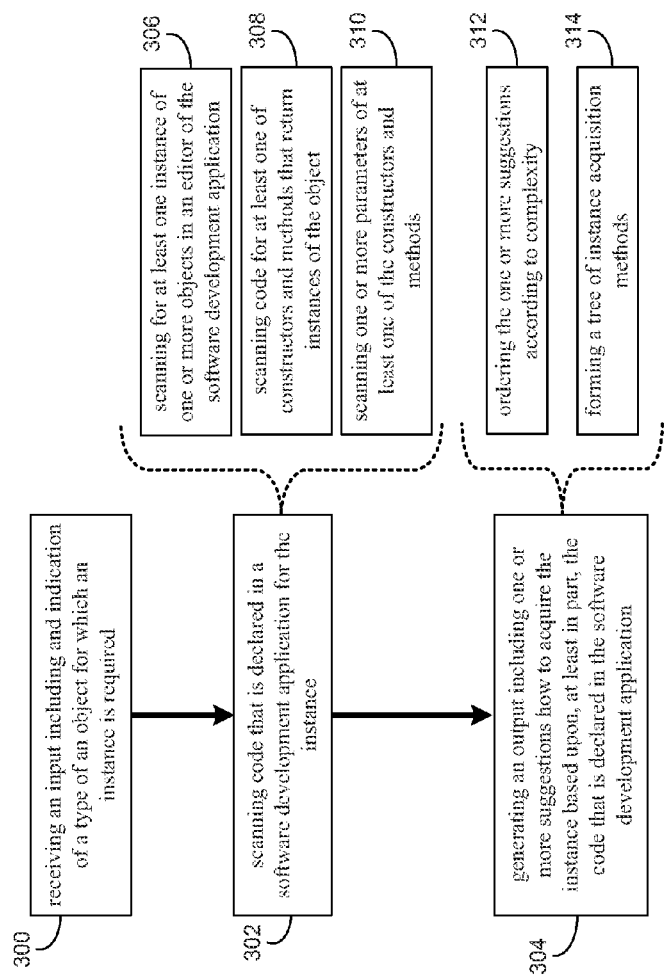
FIG. 3 is an illustrative flowchart of the acquirer process of FIG. 1 according to one or more implementations of the present disclosure.
Figure 4:
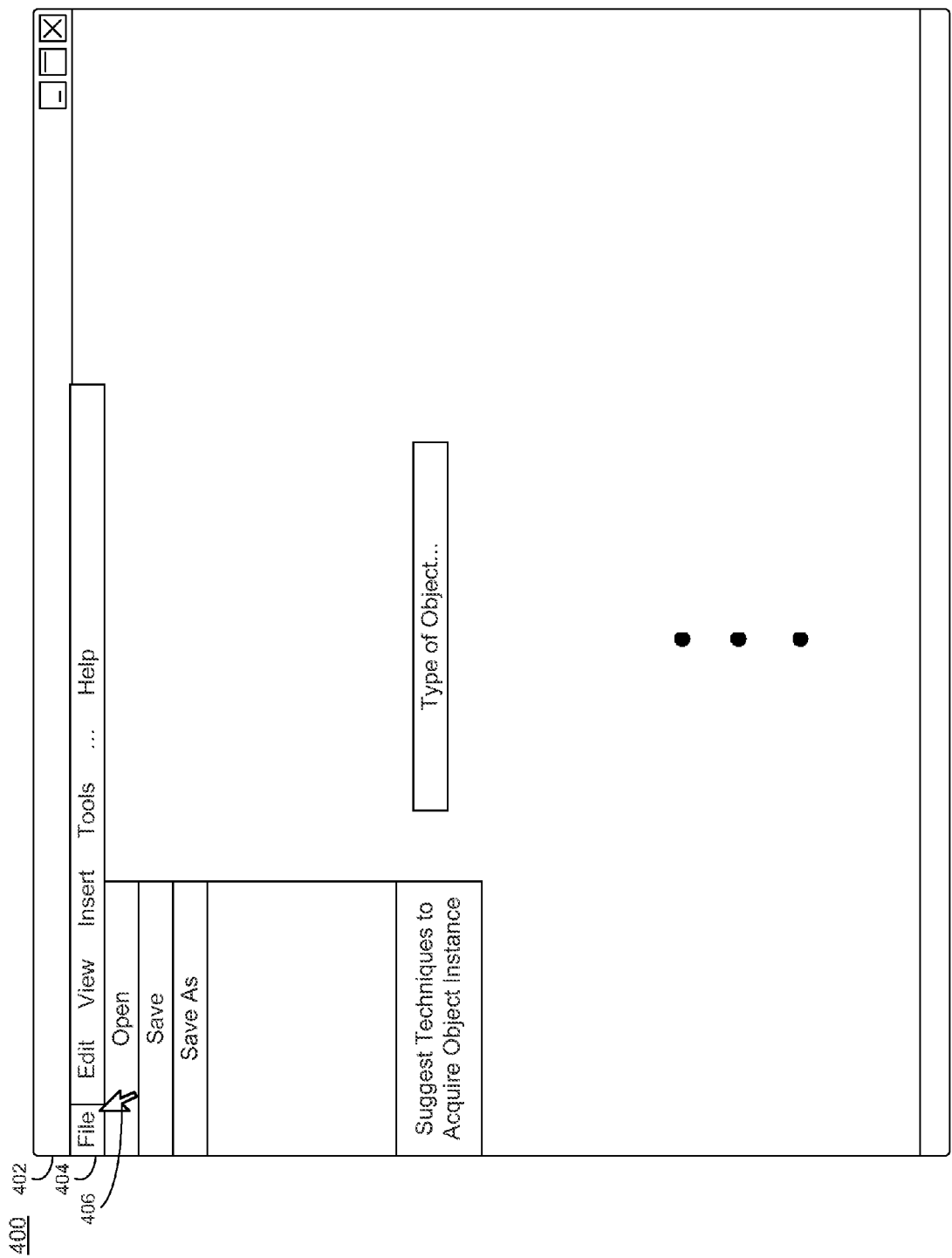
FIG. 4 is an illustrative diagrammatic view of a screen image displayed by the acquirer process of FIG. 1 according to one or more implementations of the present disclosure.
Figure 5:
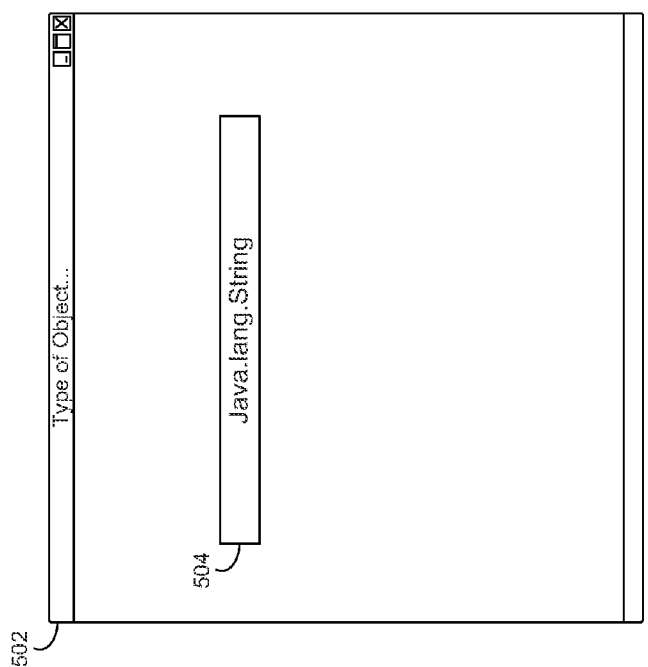
FIG. 5 is an illustrative diagrammatic view of a screen image displayed by the acquirer process of FIG. 1 according to one or more implementations of the present disclosure.
Figure 6:
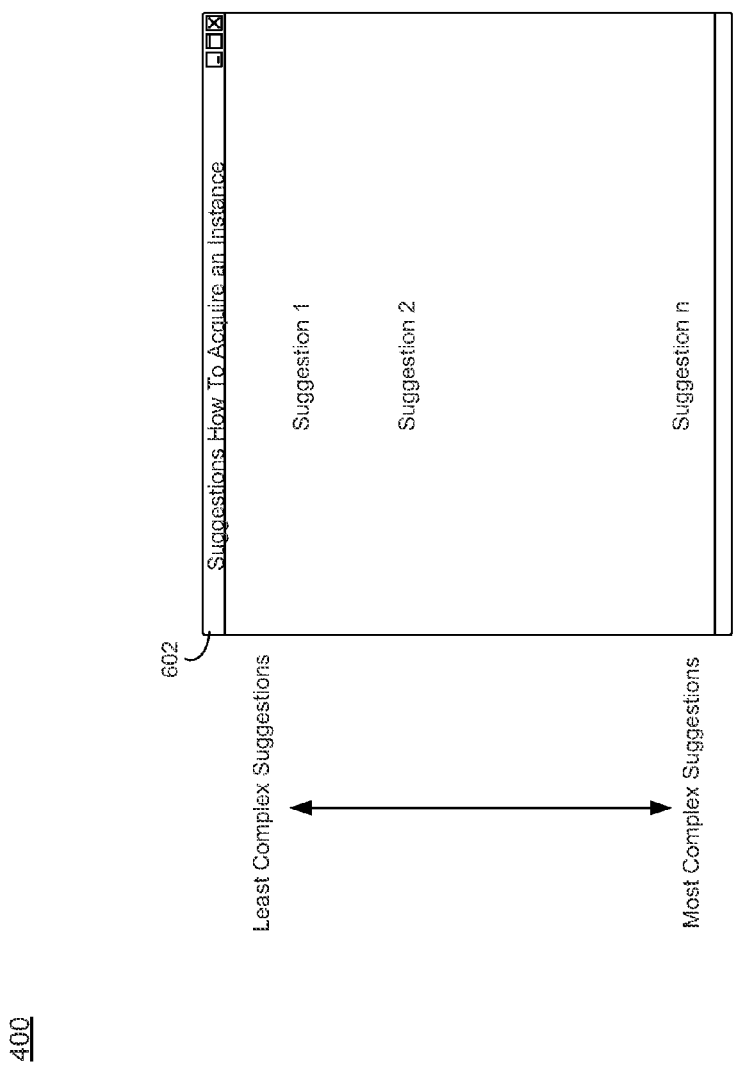
FIG. 6 is an illustrative diagrammatic view of a screen image displayed by the acquirer process of FIG. 1 according to one or more implementations of the present disclosure.
Figure 7:
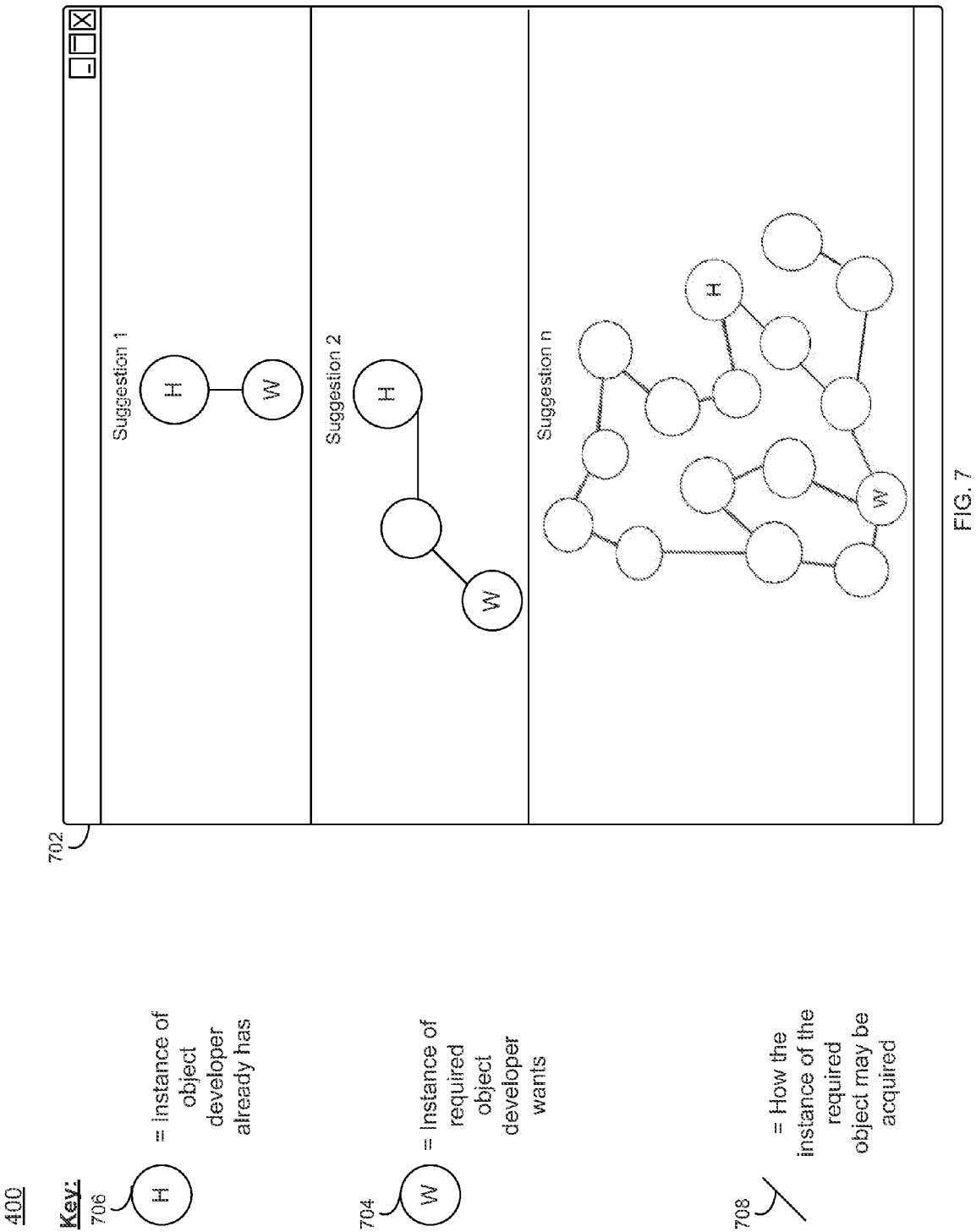
FIG. 7 is an illustrative diagrammatic view of a screen image displayed by the acquirer process of FIG. 1 according to one or more implementations of the present disclosure.

Referring also to FIG. 2, there is shown a diagrammatic view of client electronic device 38. While client electronic device 38 is shown in this figure, this is for illustrative purposes only and is not intended to be a limitation of this disclosure, as other configuration are possible. For example, any computing device capable of executing, in whole or in part, acquirer process 10 may be substituted for client electronic device 38 within FIG. 2, examples of which may include but are not limited to computer 12 and/or client electronic devices 40, 42, 44.

Client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device. An I/O controller (e.g., I/O controller 202) may be configured to couple microprocessor 200 with various devices, such as keyboard 206, pointing/selecting device (e.g., mouse 208), custom device (e.g., device 215), USB ports (not shown), and printer ports (not shown). A display adaptor (e.g., display adaptor 210) may be configured to couple display 212 (e.g., CRT or LCD monitor(s)) with microprocessor 200, while network controller/adaptor 214 (e.g., an Ethernet adaptor) may be configured to couple microprocessor 200 to the above-noted network 14 (e.g., the Internet or a local area network).

As discussed above and referring also to FIGS. 3-7, acquirer process 10 may receive 300, at a computing device, an input including an indication of a type of an object for which an instance is required. Code that is declared in a software development application may be scanned 302 by acquirer process 10 for the instance. An output may be generated 304 by acquirer process 10 including one or more suggestions how to acquire the instance based upon, at least in part, the code that is declared in the software development application.

Assume for example purposes only that a user (e.g., user 46) is a software developer that is writing code, e.g., in a software development application (e.g., Integrated Development Environment (IDE) application 20). Further assume that user 46 needs to find, e.g., how to acquire an instance of a particular object. This may prove difficult, since, e.g., there may be many patterns through which an instance of an object may be acquired, such as but not limited to using a constructor method, using a static factory method, using a non-static class method, using a public static field, or using a local or remote service. For example, given an instance 's' of the object String from, e.g., a JavaSE library associated with IDE application 20, user 46 may want to convert the string into an instance of the object StringBuffer. To do so, user 46 may need to know that the way to do so may be through the constructor, e.g.:

(A)
StringBuffer buffer=new StringBuffer(s);

As another example, given an instance 's' of the object String from, e.g., the JavaSE library, user 46 may want to convert the string into an instance of the object Boolean. To do so, user 46 may need to know that the way to do so may be through the static factory method, e.g.:

(B) Boolean boolean=Boolean.valueOf(s);

As another example, suppose user 46 wants an instance of the object Boolean that represents 'true'. To do so, user 46 may need to know that the way to do so may be through the public static final constant, e.g.:

(C)
Boolean boolean=Boolean.TRUE;

As another example, given an instance 'arrayList' of the object ArrayList in, e.g., the JavaSE library, user 46 may want to convert arrayList into an array Object[ ]. To do so, user 46 may need to know that the way to do so may be through using an instance method on ArrayList, e.g.:

(D)
Object[ ] array=arrayList.toArray( )

As another example, suppose a hypothetical API provides an AddressLookupService that, given an instance 'person' of the object Person, may provide user 46 with an instance of the object Address, which may encapsulate the address at which the person lives. That is, if addressLookupService is an instance of AddressLookupService, then:

Address
homeAddress=addressLookupService.getHomeAddress (person);

Suppose further that the same API provides a second API, called, e.g., CurrentLocationService, that may provide user 46 an instance of the object Address that may encapsulate where the person is at the current time. That is, if currentLocationService is an instance of CurrentLocationService, then:

Address
currentAddress=currentLocationService.getCurrentAddress (person);

In the example, user 46 may want to acquire both of these addresses, but may not be aware about the existence of these services, and/or the functionality that they may offer. Further suppose that the API for these services may be currently imported into IDE application 20 used by user 46. Further, suppose that instances of these services may be acquired using the methods getAddressLookupService( ) and getCurrentLocationService( ) on a object called, e.g., ServiceLocator. User 46 may spend a lot of time manually searching to work out that the following code may be required, e.g.:

(E)
Address
homeAddress=ServiceLocator.getAddressLookup
Service( ).getHomeAddress(person);
Address
currentAddress=ServiceLocator.getCurrentLocation
Service( ).getCurrentAddress(person);

At least in the above examples, the ability of IDE application 20 (e.g., via acquirer process 10) to generate and provide suggestions of these example solutions may allow user 46 to develop software more easily and more efficiently.

In some implementations, acquirer process 10 may receive 300, at a computing device (e.g., client electronic device 38), an input including an indication of a type of an object for which an instance is required. For example, and referring at least to FIG. 4, a user interface (e.g., user interface 400) associated with acquirer process 10, IDE application 20, client application 22, or combination thereof, is shown on a display (e.g., display 212 of client electronic device 38). Assume in the example that a window (e.g., window 402) of user interface 400 includes at least a portion of an IDE for developing software. Acquire process 10 may receive 300 an input from, e.g., user 46. For example, window 402 may include an option for user 46 to select an action. For instance, window 402 may include a menu option (e.g., menu option 404) that when selected by user 46 (e.g., via curser 406) may provide an action (e.g., "Suggest Techniques to Acquire Object Instance"). Other techniques to provide the above-noted action may also be used without departing from the scope of the disclosure. For example, acquirer process 10 may include a keyboard shortcut to provide the above-noted action. In the example, and referring at least to FIG. 5, once the action "Suggest Techniques to Acquire Object Instance" is selected, another window (e.g., window 502) may be displayed. Window 502 may be, e.g., a pop-up window or may be a part of window 402. Acquirer process 10 may receive 300 the above-noted input by, e.g., user 46 entering, in object type entry portion 504 of window 502, the type of the object for which an instance is required, for instance, "java.lang.String". In some implementations, object type entry portion 504 may be readily available to user 46 without any of the above-noted menu options or keyboard shortcuts. It will be appreciated that acquirer process 10 may receive 300 the input using any technique without departing from the scope of the disclosure. Additionally/alternatively, acquirer process 10 need not receive 300 the input directly from user 46 and may receive 300 the input indirectly (e.g., via an intermediate portion of acquirer process 10, IDE application 20, client application 26, or combination thereof).

In some implementations, code that is declared in a software development application (e.g., IDE application 20) may be scanned 302 by acquirer process 10 for the instance. For example, acquirer process 10 may provide the functionality in IDE application 20 to suggest techniques of acquiring an instance of an object that user 46 may require from the instances of one or more objects that user 46 currently has access to, e.g., using the code that the developer currently has declared, e.g., via IDE application 20. In some implementations, code declared in the IDE may include all code of which IDE application 20 is aware. For example, in some implementations, the code that is declared in the software development application (e.g., IDE application 20) may include at least one of code that is part of a current project in the software development application, code that is imported as binaries, and code made aware to the software development application through a remote service (e.g., an internet search, remote server or remote repository of common jars that acquirer process 10 may be aware of and may import into IDE application 20 for the indexes to be built).

In some implementations, scanning 302 the code may include scanning 306 for at least one instance of one or more objects in an editor of the software development application. For instance, scanning 302 the code may include scanning 306 for at least one instance of one or more objects in the context of an editor of the software development application. For example, acquirer process 10 may scan 306 for instances of objects to which user 46 may currently have access in the current context of IDE application 20. For instance, the current context may include the objects and methods that may be currently selected in an editor of IDE application 20. In some implementations, the accessible instance(s) may be the local and instance variables from the current context, as well as instances that may be acquired, for example, through methods on the currently selected instance. In some implementations, acquirer process 10 may acquire these items using, e.g., one or more APIs that may exist in IDE application 20. For example, consider the following:

```
public class MyClass {
    private String m = "myMemberVariableString";
    public void myMethod( ) {
        String s = "mylocalVariableString"; <<CURSOR_IS_HERE>>
    }
}
```

In the example, the currently selected context is myMethod in the class MyClass. Further in the example, acquirer process 10 may detect that instances m and s are already available. In addition, acquirer process 10 may have access to the current instance of MyClass, which may be accessed through, e.g., the Java keyword 'this'. Therefore, acquirer process 10 may have access to m, s, and 'this'.

In some implementations, acquirer process 10 may use these instances that available in the current context as starting points to acquire the instance for which the developer may be looking. In the example, acquirer process 10 may use s:

```
public class MyClass {
    public void myMethod( ) {
        String s = "myString"; Boolean boolean = new Boolean(s);
    }
}
```

The class and method in the current context may be accessed by acquirer process 10 using, e.g., the APIs of IDE application 20.

In some implementations, scanning 302 the code may include scanning 308 code for at least one of constructors and methods that return instances of the object (e.g., the required object). For example, acquirer process 10 may scan 308 at least a portion of the code currently imported into IDE application 20 for, e.g., constructors [such as in the above example (A)] and methods [such as in the above example (B)] that may return instances of the required object. In some implementations, acquirer process 10 may scan, e.g., public static constants [such as in the above example (C)]. In some implementations, acquirer process 10 may start the search by reviewing the constructor and methods on the required object itself, since, e.g., this may be one of the simpler ways to access instances of the object. Acquirer process 10 may also scan all other objects that may be declared in IDE application 20.

In some implementations, scanning 302 the code may include scanning 310 one or more parameters of at least one of the constructors and methods. For instance, scanning 302 the code may include scanning 310 one or more parameters of at least one of the constructors and methods that were identified previously. In some implementations, acquirer process 10 may attempt to find constructors and methods whose parameters can be supplied by instances that, e.g., the developer, may already have in their context, or else whose parameters may be acquired indirectly from the instances that the developer may already have in their context, or else can be trivially acquired in the programming language in question. For example, acquirer process 10 may scan 310 the parameters of the above-noted constructors and methods, and may search for parameter types that may match the instances of objects to which user 46 (e.g., via IDE application 20) may already have access (as discussed above). In some implementations, such as an example with non-static methods [such as in the above example (E)], the instance that the method is defined on may also be a "parameter" in this context, since, e.g., it may be required to execute the method. In some implementations, IDE application 20 may include this information stored in, e.g., indexes, and may be made available through an API of IDE application 20. This may enable access to the information without requiring acquirer process 10 to review each file that may be declared in IDE application 20. In some object oriented languages, such as Java, primitive types may be acquired using (e.g., int i=0, boolean b=false) and objects that may be acquired from object literals acquired using (e.g., String s="myString", Class c=MyClass.class). These types may depend on the programming language in use. In some implementations, acquirer process 10 may discount the simpler parameter types, e.g., if they may be acquired trivially.

In some implementations, an output may be generated 304 by acquirer process 10 including one or more suggestions how to acquire the instance based upon, at least in part, the code that is declared in the software development application. For example, and referring at least to FIG. 6, user interface 400 may include a window 602 that displays the suggestions generated 304 by acquirer process 10 using the above-noted techniques. In some implementations, any suggestions discovered by acquirer process 10 may be generated 304 in an output. In some implementations, a threshold number of suggestion may be discovered by acquirer process 10 before being generated 304 in an output. For instance, if acquirer process 10 has discovered a suitable number of suggestions (e.g., 10), then acquirer process 10 may generate 304 an output of those suggestions, which may be displayed to user 46 via display 212. In some implementations, the output generated 304 by acquirer process 10 may be sent to user 46 or other users, e.g., via email or other known transmission method.

In some implementations, generating 304 the output including one or more suggestions how to acquire the instance may include ordering 312 the one or more suggestions according to complexity. For example, the one or more suggestions may be ordered 312 from the simplest methods to the most complex methods of acquiring the instance. For instance, assume for example purposes only that user 46's context includes a class with a method that declares a String, e.g.:

```
public class MyClass {
    public void myMethod( ) {
        String s = "myString"; <<CURSOR_IS_HERE>>
    }
}
```

In the example, further assume that user 46 selects the "Suggest Techniques to Acquire Object Instance" function enabled via acquirer process 10 and chooses Boolean as the required object type. In some of the above-described examples, acquirer process 10 may acquire the Boolean using, e.g., public static final constants. In some of the above-described examples, acquirer process 10 may acquire the Boolean using, e.g., primitive types and classes that may be acquired more easily and may be listed among the first suggestions. Though it may be likely that user 46 (e.g., via acquirer process 10) may prefer to use some suggestions over others, it will be appreciated that user 46 may use any of the generated 304 suggestions to acquire the Boolean.

In some implementations, user 46 may (e.g., via window 602) select one or more of the suggestions, and acquirer process 10 may insert the code for the selected suggestion required to convert from the instances of objects in the current context and the required object, at the current code point (e.g., where the cursor is currently located in the code for IDE application 20). For example, suppose in the example the first suggested acquisition method [such as in the above example (B)], is chosen by the developer (e.g., user 46). Then, the code may become, e.g.:

```
public class MyClass {
public void myMethod( ) {
String s = "myString"; Boolean boolean = new Boolean(s);
    }
}
```

In some implementations, if the threshold number of suggestion are not discovered by acquirer process 10, (or if user 46 requests more suggestions via user interface 400), acquirer process 10 may again review the parameters of the above-noted constructors and methods that may be used to acquire the instance of the required object. For those that may not be available in the current context of user 46 (e.g., via IDE application 20), acquirer process 10 may iterate the above-noted scanning 302 (e.g., scanning 306 for instances of objects in an editor of the software development application, scanning 308 code for at least one of constructors and methods that return instances of the object, and scanning 310 one or more parameters of at least one of the constructors and methods), looking for ways that these parameters may be acquired from the instances of objects that may be available in the current context of user 46. Using this example technique, the object acquisition in the above example [D] may be discovered. For example, suppose there are currently no local or instance variables in the current context of user 46 in IDE application 20, e.g.:

```
public class MyClass {
    public void myMethod( ) {
        <<CURSOR_IS_HERE>>
    }
}
```

Further suppose user 46 selects the above-noted "Suggest Ways to Acquire Object Instance" function enabled by acquirer process 10, and chooses (e.g., via a drop down menu) or enters Address as the required object type input received 300 by acquirer process 10. In the example, following the above-noted techniques of acquire process 10, acquirer process 10 may first identify that addressLookupService.getHomeAddress( ) and currentLocationService.getCurrentAddress( ) may both return an instance of Address. Acquirer process 10 may further recognize that user 46 via IDE application 20 may not have access to an instance of addressLookupService and/or currentLocationService in the current context of IDE application 20. In the second iteration, IDE application 20 (e.g., via acquirer process 10) may identify that the required instances, addressLookupService and currentLocationService, may be returned from the static methods ServiceLocator.getAddressLookupService( ) and ServiceLocator.getCurrentLocationService( ) respectively. IDE application 20 (e.g., via acquirer process 10) may identify that these methods have no parameters, and thus no further iterations need be required. In the example, acquirer application 10 may generate 304 the following example recommendations:

(1) Address homeAddress=ServiceLocator.getAddressLookupService( ).getHomeAddress( );

(2) Address currentAddress=ServiceLocator.getCurrentLocationService( ).getCurrentAddress( );

Suppose the developer chooses (1) and (2). Then the code becomes:

```
public class MyClass {
    public void myMethod( ) {
        Address homeAddress =
        ServiceLocator.getAddressLookupService( ).getHomeAddress( );
        Address currentAddress =
ServiceLocator.getCurrentLocationService( ).getCurrentAddress( );
    }
}
```

In some implementations, generating 304 the output including one or more suggestions how to acquire the instance may include forming 314 a tree of instance acquisition methods. For example, acquirer process 10 may rely on the code having been indexed by IDE application 20 as noted above. "Indexed" may broadly be referred to as having IDE application 20 build a graph of some or all of the ways that the objects and their constructors and methods may be related to each other. In some implementations, acquirer process 10 may rely on the graph to form 314 the tree. For example, and referring at least to FIG. 7, user interface 400 may include a window 702 that displays a tree of suggestions generated 304 by acquirer process 10 using the above-noted techniques. The search for objects that may, in turn, be acquired from each other may form a tree of instance acquisition methods, in which it may be the paths that allow the acquisition of the instance of the required object (e.g., node 704) with the instances of objects that user 46 (e.g., via IDE application 20) may already have (e.g., node 706). Each branch (e.g., branch 708) in the path may include the technique(s) of how the instance of the required object may be acquired (e.g., a chain method call) by acquirer process 10. Acquirer process 10 may continue the iterative process deeper into instance acquisition tree 704 until, e.g., user 46 (via acquirer process 10) identifies an instance acquisition path in instance acquisition tree 704 with which user 46 is happy. In some implementations, tree 704 may include the one or more suggestions ordered 312 from the simplest methods to the most complex methods of acquiring the instance. For example, acquirer process 10 may order the matches with shortest (e.g., most direct and simplest) branch path(s) from node 706 to node 704 first. For instance, the first results shown may be the simplest method to acquire the required instance from the instances that are available to user 46 (e.g., via IDE application 20). As noted above, user 46 may select one or more of the suggestions, and acquirer process 10 may insert the code selected at the current code point.

While one or more of the above examples may be written in Java, it will be appreciated that similar examples may apply to any object oriented programming language, such as but not limited to C#, C++, JavaScript, etc. As such, the description of using any specific object oriented programming language should be taken as an example only and not to otherwise limit the scope of the disclosure.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, and combinations thereof) are possible without departing from the scope of the disclosure defined in the appended claims.

What is claimed is:

1. A computer-implemented method comprising:
   receiving, at a computing device, an input including an indication of a type of an object for which an instance is required;
   scanning code that is declared in a software development application for the instance; and
   generating an output including one or more suggestions how to acquire the instance based upon, at least in part, the code that is declared in the software development application, including generating the output as a tree of instance acquisition methods wherein the tree includes a graph having nodes indicating instances of objects the user already has, and having branches representing techniques of how to acquire the instance.

2. The computer-implemented method of claim 1 wherein the code that is declared in the software development application includes at least one of code that is part of a current project in the software development application, code that is imported as binaries, and code made aware to the software development application through a remote service.

3. The computer-implemented method of claim 1 wherein scanning the code includes scanning for at least one instance of one or more objects in an editor of the software development application.

4. The computer-implemented method of claim 1 wherein scanning the code includes scanning code for at least one of constructors and methods that return instances of the object.

5. The computer-implemented method of claim 4 wherein scanning the code includes scanning one or more parameters of at least one of the constructors and methods.

6. The computer-implemented method of claim 1 wherein generating the output including one or more suggestions how to acquire the instance includes ordering the one or more suggestions according to complexity.

* * * * *